US005842084A

United States Patent [19]

Harada et al.

[11] Patent Number: 5,842,084

[45] Date of Patent: Nov. 24, 1998

[54] DOCUMENT FEEDER WITH REMOVABLE BELT UNIT

[75] Inventors: Hiroyuki Harada; Hiroshi Kobayashi; Masahiro Sako, all of Osaka, Japan

[73] Assignee: Mita Industrial Co., Ltd., Osaka, Japan

[21] Appl. No.: 961,248

[22] Filed: Oct. 30, 1997

[30] Foreign Application Priority Data

Nov. 13, 1996 [JP] Japan .................................... 8-318767

[51] Int. Cl.[6] ............................ G03L 15/04; G03B 27/62

[52] U.S. Cl. .............................. 399/110; 396/367; 355/75

[58] Field of Search .................................... 399/107, 110, 399/118, 367; 355/50, 75

[56] References Cited

U.S. PATENT DOCUMENTS

| | | | |
|---|---|---|---|
| 4,589,768 | 5/1986 | Iwata et al. | 355/50 |
| 5,213,322 | 5/1993 | Matsuo et al. | 271/275 |
| 5,470,051 | 11/1995 | Morigami et al. | 355/75 X |

FOREIGN PATENT DOCUMENTS

| | | |
|---|---|---|
| 61-64644 | 4/1986 | Japan . |
| 61-77038 | 4/1986 | Japan . |
| 61-229744 | 10/1986 | Japan . |
| 5-31638 | 8/1993 | Japan . |

*Primary Examiner*—Joan H. Pendegrass
*Attorney, Agent, or Firm*—Beveridge, DeGrandi, Weilacher & Young, LLP

[57] ABSTRACT

A document feeder having a transportation belt unit for transporting a document original; a front side plate and a rear side plate respectively projecting upright at widthwise opposite edges of the transportation belt unit; a pair of stays each extending between the front side plate and the rear side plate; a front stay plate detachably fastened to portions of the pair of stays adjacent to the front side plate by means of a front fastening member; and a rear stay plate fastened to portions of the pair of stays adjacent to the rear side plate by means of a rear fastening member which can be loosened. The front side plate has a recess open to its underside for receiving the front stay plate for engagement therewith in a disengageable manner. The front stay plate is fastened to the front side plate in engagement with the recess by the front fastening member.

4 Claims, 7 Drawing Sheets

DOCUMENT FEEDER WITH REMOVABLE BELT UNIT

BACKGROUND OF THE INVENTION

1. Field of the Invention

The present invention relates to a document feeder for use in combination with an image forming apparatus or the like, the document feeder having a transportation belt to be located atop a contact glass of the image forming apparatus for transporting a document original on the contact glass.

2. Description of Related Art

Some image forming apparatuses such as electrophotographic copying machines employ a document feeder for transporting a document original on a contact glass of the apparatus. Such a document feeder typically includes a transportation belt unit to be located atop the contact glass.

Since a transportation belt provided in the transportation belt unit is consumable, the belt is to be replaced with a new one after its predetermine useful service life. In the event of trouble, there will be a need to remove the transportation belt. Therefore, the transportation belt is typically fitted in the transportation belt unit in a readily removable manner.

Conventionally, the fitting of the transportation belt is achieved in a manner as shown in FIG. 7A or 7B.

In accordance with the construction shown in FIG. 7A, a document feeder body a is supported openably with respect to an image forming apparatus body b. A transportation belt unit c is inclinably supported on the document feeder body a. Thus, the transportation belt d can be drawn out forward by inclining the transportation belt unit c downward with respect to the document feeder body a with the document feeder body a being kept half-open.

According to this prior art, the transportation belt d can readily be replaced because the front side of the transportation belt unit c is widely opened. On the other hand, the construction is complicated because many components are provided for the open/close mechanism. Further, the document feeder body a and the transportation belt unit c are constructed as separate units, so that stays should separately be provided therein for enhancement of their rigidity. This increases the number of components, resulting in increased costs and higher bulkiness.

In accordance with the construction shown in FIG. 7B (see Japanese Examined Utility Model Publication (KOKOKU) No. 5-31638 (1993)), a transportation belt unit c is supported by a pair of stays g and h which are each interposed between a front side plate e and a rear side plate f respectively disposed upright on the front and rear sides of the transportation belt d. The front side plate e includes two side plates e1 and e2, which are connected by a movable side plate i. For the replacement of the belt, the side plates e1 and e2 are disconnected with the movable side plate i pivoted upward as shown in FIG. 7B. When a document feeder body (not shown) and the transportation belt unit c are lifted in this state, the stays g and h are slightly deformed and the transportation belt unit c is inclined by gravity with the side plate e2 downward. Thus, the side plate e2 is positioned below the document feeder body, whereby the transportation belt d can be drawn out forward.

According to this construction, the provision of the pair of stays g and h between the front and rear side plates e and f increases the rigidity of the transportation belt unit c thereby to enhance the overall structural strength of the document feeder body. However, the opening angle of the transportation belt unit c (the angle of inclination of the transportation belt unit c with respect to the document feeder body) depends on the degree of the deformation of the stays g and h, and is not always large enough. This makes it difficult to replace the transportation belt d.

SUMMARY OF THE INVENTION

It is a first object of the present invention to provide a document feeder featuring easy replacement of a transportation belt thereof.

It is a second object of the invention to provide a highly rigid document feeder which can be constructed with a reduced number of components at lower costs.

The document feeder according to the present invention comprises a transportation belt unit for transporting a document original, a front side plate and a rear side plate respectively projecting upright at widthwise opposite edges of the transportation belt unit, a pair of stays each extending between the front side plate and the rear side plate, a front stay plate detachably fastened to portions of the pair of stays adjacent to the front side plate by means of a front fastening member, and a rear stay plate fastened to portions of the pair of stays adjacent to the rear side plate by means of a rear fastening member which can be loosened. The front side plate has a recess open to its underside for receiving the front stay plate for engagement therewith in a disengageable manner. The front stay plate is fastened to the front side plate in engagement with the recess by the front fastening member.

For replacement of the belt, the transportation belt unit is lowered by gravity by removing the front fastening member of the front stay plate and loosening the rear fastening member of the rear stay plate. Thus, the front stay plate is disengaged from the recess of the front side plate, so that the front face of the transportation belt unit can be brought away from a frame edge of the document feeder, i.e., from the recess of the front side plate. Thus, the transportation belt can readily be drawn out forward, thereby ensuring easier replacement of the transportation belt.

Further, the front side plate and the rear side plate are connected by the stays to form a highly rigid frame, which rigidly supports the transportation belt unit. At the same time, the overall structural strength of the document feeder can be increased, so that the rigidity of the document feeder can be enhanced with a reduced number of components at lower costs.

The foregoing and other objects, features and effects of the present invention will become more apparent from the following description of the preferred embodiment with reference to the attached drawings.

DESCRIPTION OF THE PREFERRED EMBODIMENT

Figure 1:
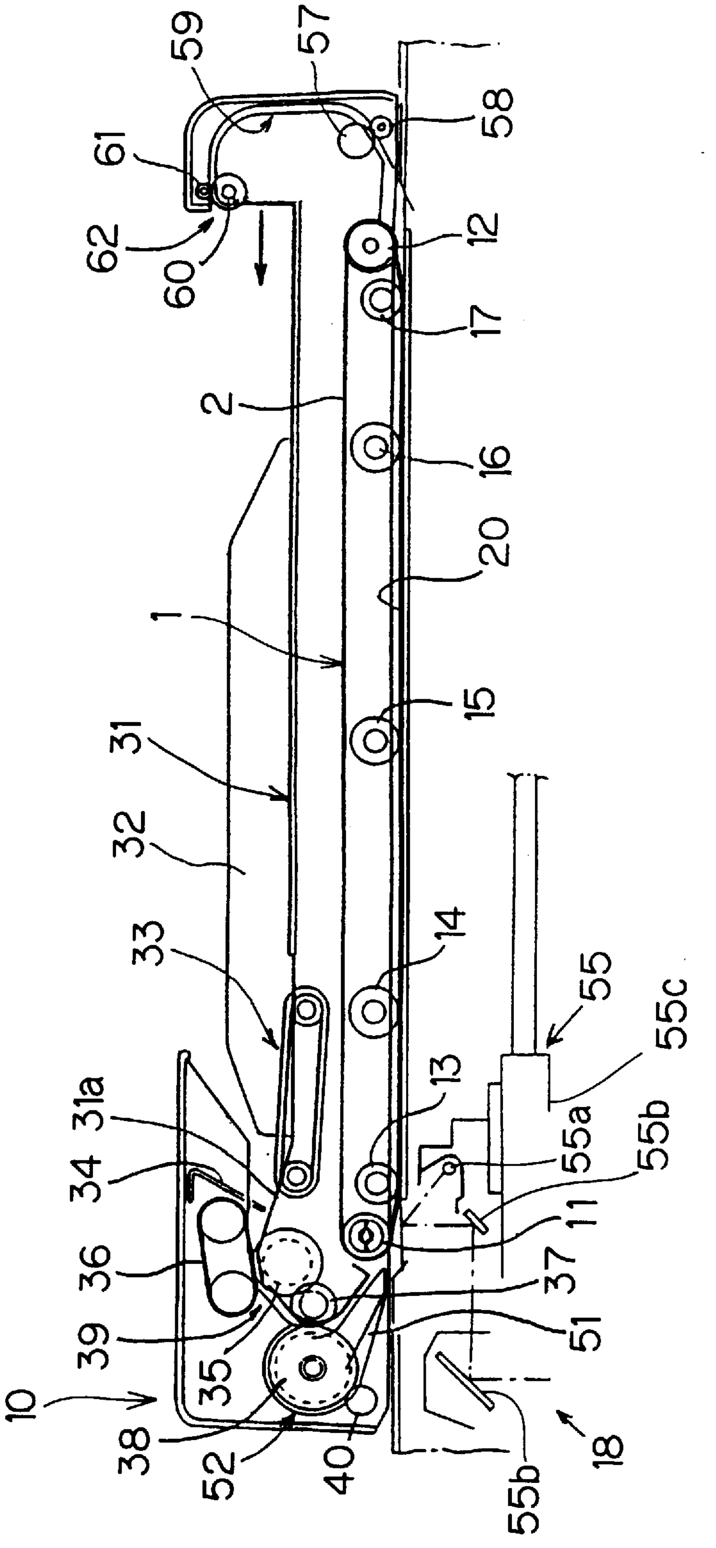
FIG. 1 is a sectional view illustrating the overall construction of a document feeder according to one embodiment of the press invention.

FIG. 1 is a sectional view illustrating the internal construction of a document feeder according to one embodiment of the present invention. The document feeder 10 is to be attached to an image forming apparatus such as a copying machine. The document feeder 10 is rested atop a body 18 of the copying machine and adapted to be opened with respect to a contact glass 20 of the copying machine. Below the contact glass 20 is provided an illumination scanning system 55 for illuminating and scanning a document original placed on the upper surface of the contact glass 20.

The illumination scanning system 55 has a light source 55*a* for illuminating the document original, a plurality of reflector mirrors 55*b* for leading light emitted from the light source 55*a* and reflected on the document original into an image forming section not shown, and a driving mechanism 55*c* for laterally moving the light source 55*a* and the reflector mirrors 55*b*.

The image forming section includes, for example, a photoreceptor to be exposed to the light from the illumination scanning system 55, a main charger for uniformly charging the surface of the photoreceptor before the light exposure, a developer unit for developing an electrostatic latent image formed by the light exposure into a toner image, a transfer charger for transferring the toner image onto a sheet, and a fixing unit for fixing transferred toner particles on the sheet.

The document feeder 10 has a document original plate 31 provided on its upper face and a pair of sheet width regulating plates 32 respectively provided on front and rear edge portions of the document original plate 31. A pick-up belt 33 is provided adjacent to one edge of the document original plate 33. The pick-up belt 33 is slightly inclined upward in a document original feeding direction (in the leftward direction as seen in FIG. 1), and the document original plate 31 has a face 31*a* inclined upward from an upstream edge of the pick-up belt 33 to a downstream side in the document original feeding direction. A separator roller 35 is provided adjacent to an upper edge of the inclined face 31*a* as slightly projecting in a document original transportation path. A separator belt 36 is opposed to the separator roller 35. A document original leading edge stopper 34 is provided on an upstream side of the separator belt 36.

A curved document original feeding path 39 extends from the pick-up belt 33 to one end of the contact glass 20 (the left edge of the contact glass 20 as seen in FIG. 1). In the document original feeding path 39, a feeding roller 37 and a reverse roller 38 driven clockwise as seen in FIG. 1 in slidable contact with the feeding roller 37 are provided downstream of the separator roller 35 in a document original transportation direction. A roller 40 is provided in slidable contact with the reverse roller 38 in a position generally opposite from the feeding roller 37. A document original reversing path 52 for reversing the document original once fed onto the contact glass is defined by a guide plate 51 and the like which extend from the one end of the contact glass 20 through a roller 40 to surround the reverse roller 38.

A curved discharging path 59 extends from the vicinity of the other end of the contact glass 20 (the right edge of the contact glass as seen in FIG. 1) to the document original plate 31. In the discharging path 59, a pair of discharging rollers 57 and 58 are disposed adjacent to the contact glass 20, and another pair of discharging rollers 60 and 61 are disposed adjacent to a discharge port (outlet) 62.

A transportation belt unit 1 is provided above the contact glass 20. The transportation belt unit 1 has a driving roller 11 to be driven by a driver (not shown) and provided adjacent to the one end of the contact glass 20, and a driven roller 12 provided adjacent to the other end of the contact glass 20. A transportation belt 20 is stretched around the driving roller 11 and the driven roller 12. A portion of the transportation belt 2 facing opposite to the contact glass 20 is urged against the upper surface of the contact glass 20 by guide rollers 13 to 17. The driving roller 11 is driven for regular and reverse rotation by the aforesaid driver, so that the document original fed on the contact glass 20 can be transported either rightward or leftward as seen in FIG. 1.

The transportation belt unit 1 is incorporated in the document feeder 10, and the document feeder 10 is mounted on the image forming apparatus body 18 fitted with the contact glass 20 in such a way that the document feeder 10 can be inclined rearward up to a predetermined angle with respect to the image forming apparatus body 18.

When document originals are to be automatically and circularly fed by means of the document feeder, the document originals stacked on the document original plate 31 are fed one by one through the document original feeding path 39 onto the contact glass 20, then transported through the transportation path 59 and discharged from the discharge port 62 onto the top of the stack by the pair of discharging rollers 60 and 61. Thus, the document originals can be subjected to the copying operation again. Further, the provision of the pick-up belt 33 prevents the occurrence of a document original feeding failure and the dirtying of the back faces of the document originals.

The separator roller 35 is provided at a higher level than the pick-up belt 33. Therefore, when the second feeding of a document original is started by cooperation of the feeding roller 37 and the reverse roller 38, the fed document original is stretched taut and slightly levitated so that the contact area between the pick-up belt 33 and the document original is reduced to decrease the friction resistance. This dispenses with the provision of a one-way clutch in association with the pick-up belt 33.

Figure 2:
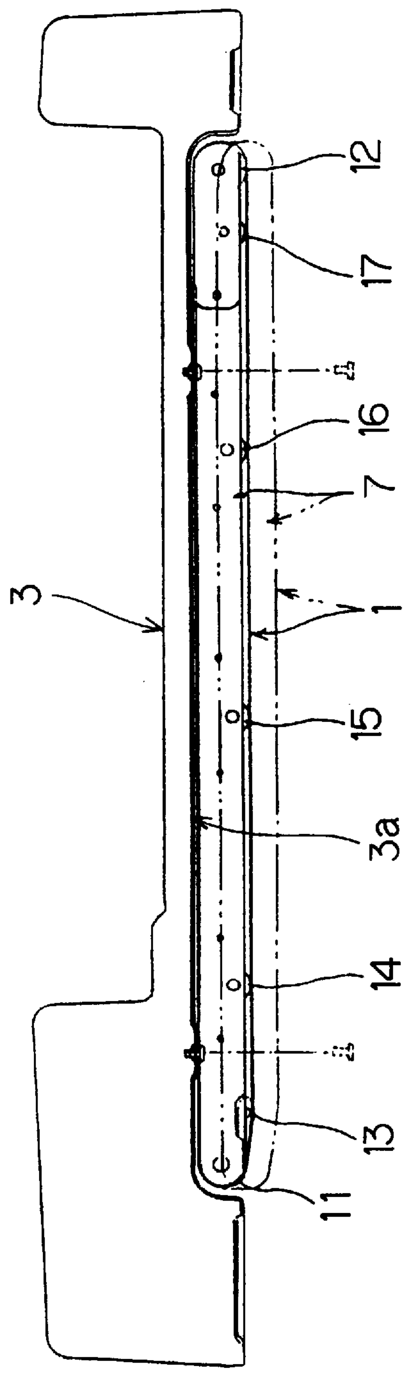
FIG. 2 is a front view illustrating a front side plate of the document feeder.
Figure 3:
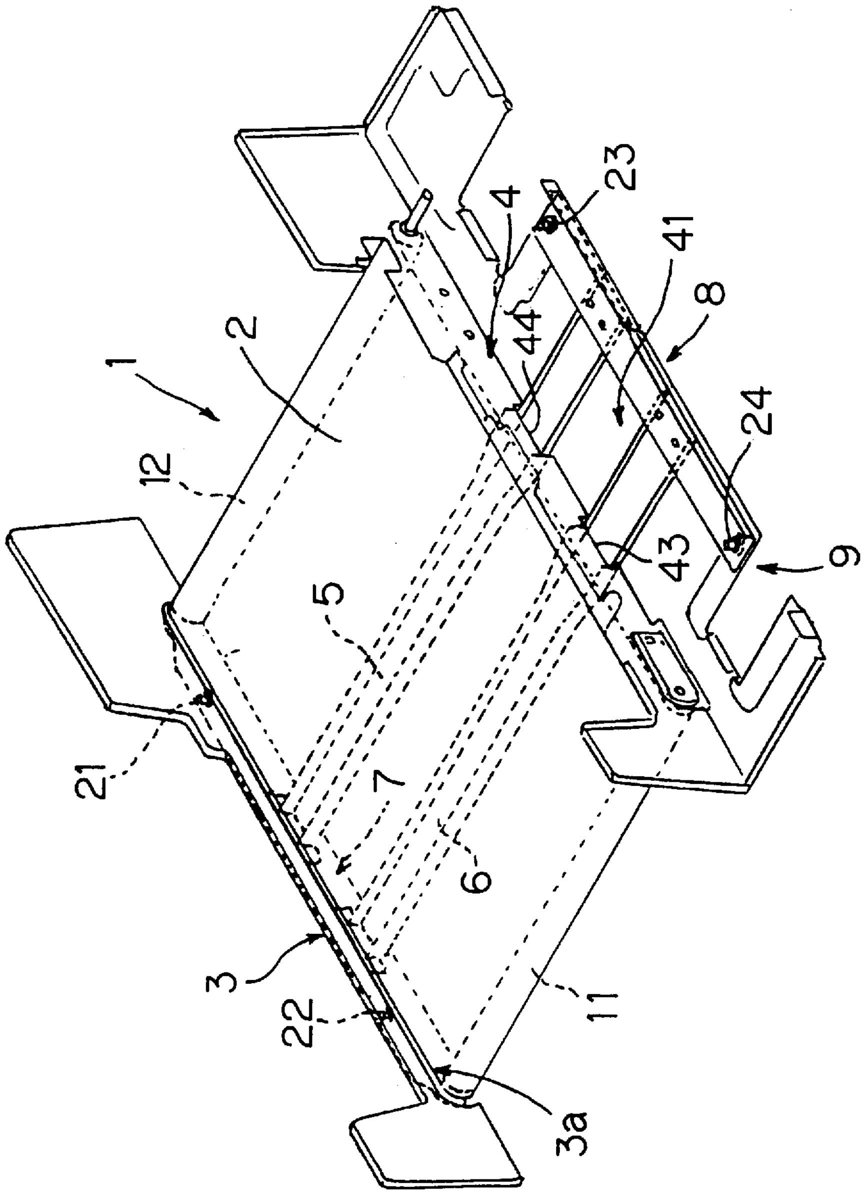
FIG. 3 is a perspective view of a frame of the document feeder as seen at an angle from its rear side.
Figure 4:
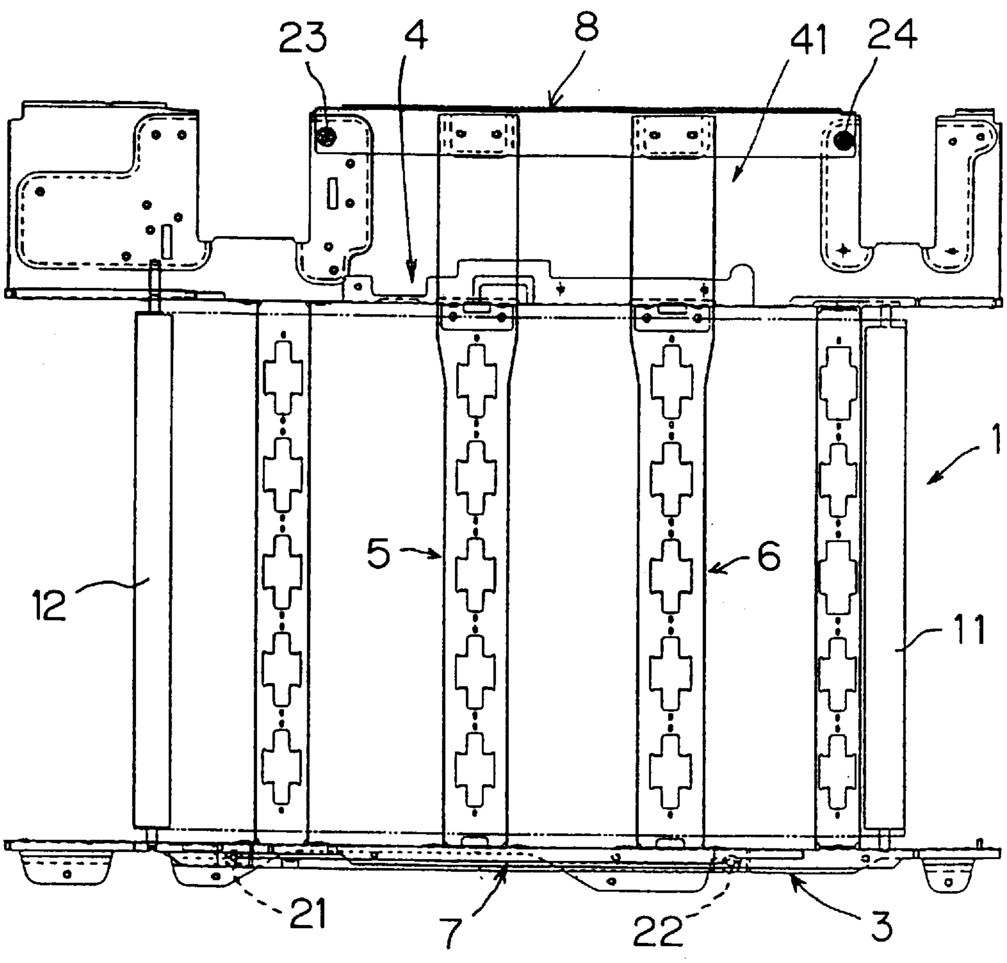
FIG. 4 is a plan view of the frame.

FIGS. 2, 3 and 4 are a front view, a perspective view as seen at an angle from the rear side, and a plan view, respectively, which illustrate a frame of the document feeder 10. A front side plate 3 and a rear side plate 4 respectively project upright from front and rear edges of the transportation belt unit 1. Stays 5 and 6 each extend between the side plates 3 and 4 for supporting the transportation belt unit 1. Front and rear edges of the stays 5 and 6 are fixed to a front stay plate 7 and a rear stay plate 8, respectively.

The front stay plate 7 is engaged with a recess 3*a* formed in the front side plate 3 and open to its underside in a disengageable manner. In the engaged state (see FIG. 3), the front stay plate 7 is fastened at its opposite ends to the front side plate 3 by means of a pair of bolts 21 and 22 in a detachable manner. The rear stay plate 8 is fastened at its opposite ends to a plate 41 bent rearwardly of the rear side plate 4 by means of a pair of bolts 23 and 24 in a detachable manner.

A highly rigid frame 9 is formed by connecting the front side plate 3 and the rear side plate 4 by the stays 5 and 6. Thus, the transportation belt unit 1 can rigidly be supported and, at the same time, the overall structural strength of the document feeder 10 can be enhanced. This imparts a high rigidity to the document feeder with a reduced number of components at lower costs.

Figure 5:
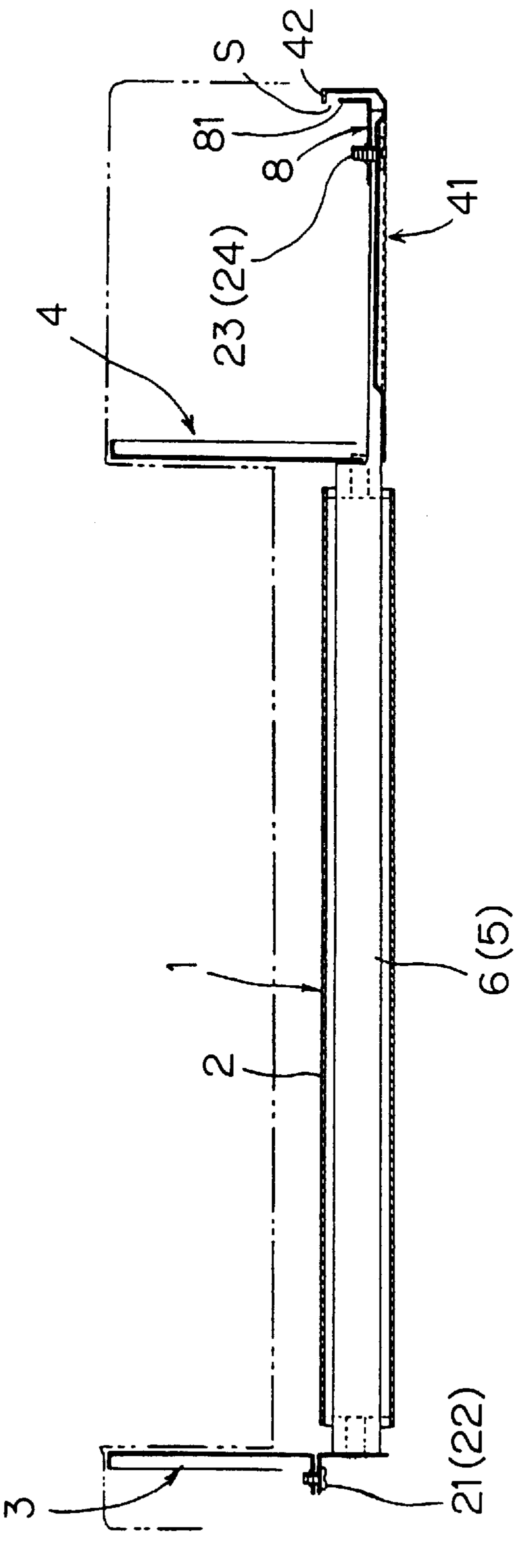
FIG. 5 is a vertical sectional view illustrating a state where a transportation belt unit is incorporated in the frame.
Figure 6:
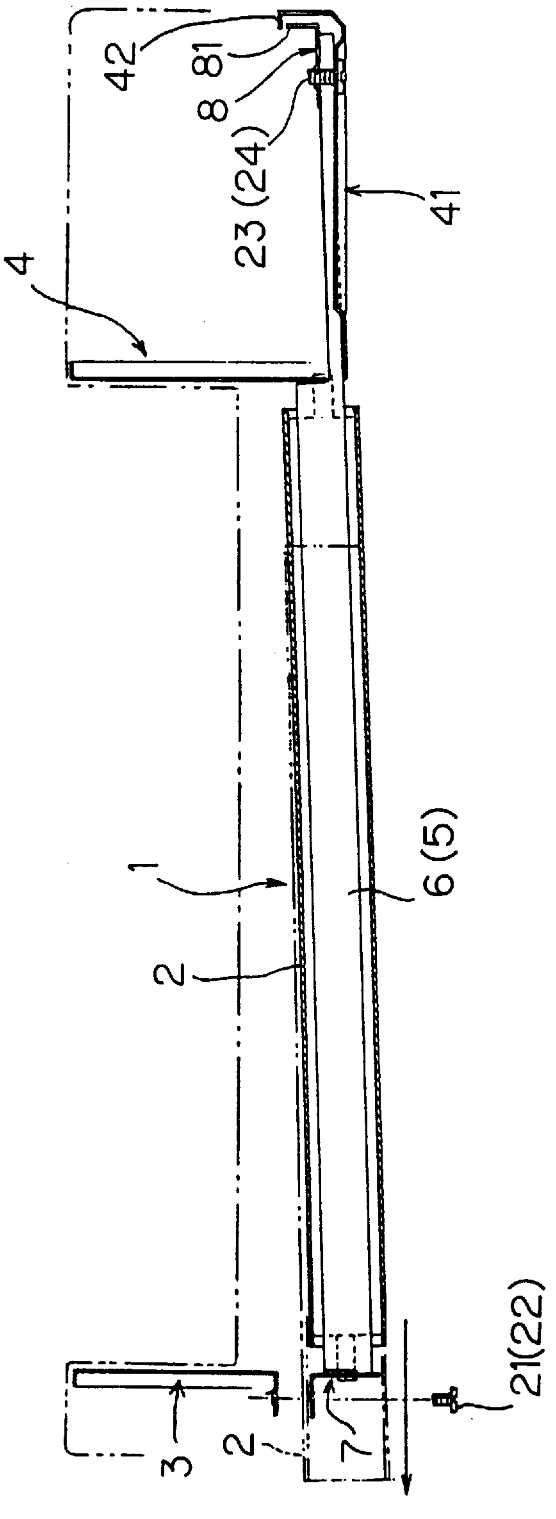
FIG. 6 is a vertical sectional view illustrating a state where the transportation belt unit is slightly lowered with respect to the frame for replacement of the transportation belt.
Figure 7A:
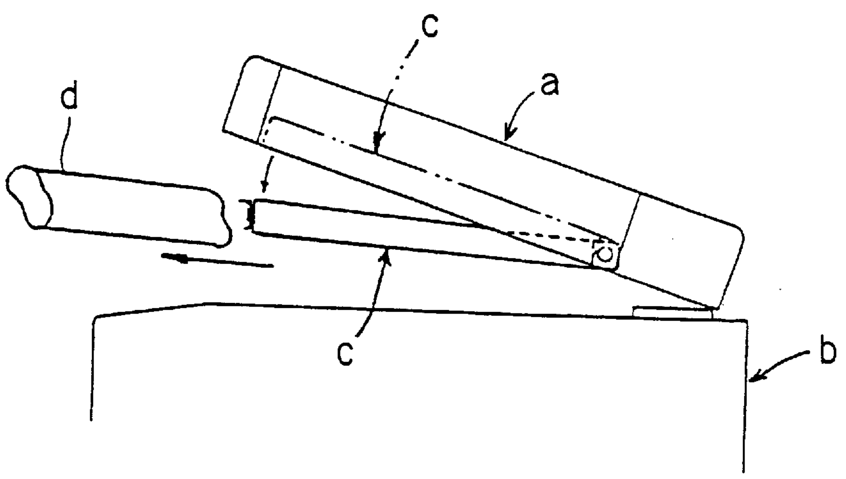
FIG. 7A (PRIOR ART)
FIG. 7A is a diagram illustrating an exemplary construction of a conventional document feeder in which a transportation belt is fitted.
Figure 7B:
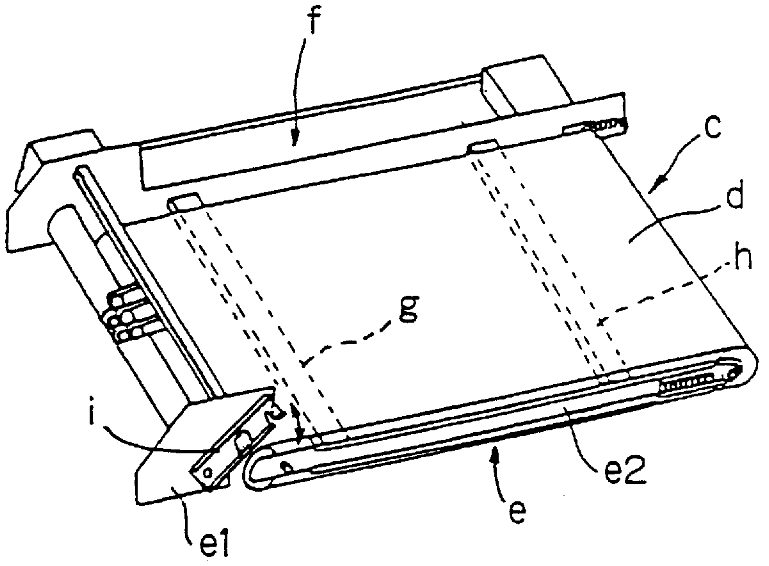
FIG. 7B (PRIOR ART)
FIG. 7B is a diagram illustrating another exemplary construction of a conventional document feeder in which a transportation belt is fitted.

The fitting of the stays 5 and 6 will be described in greater detail. The front ends of the stays 5 and 6 each abut at a right angle against the front side plate 3 and are firmly fixed thereto by a rivet or the like. Rear portions of the stays 5 and 6 are respectively inserted in cut-away portions 43 and 44 formed in lower portions of the rear side plate 4, and the rear ends thereof are each fixed to the rear stay plate 8 by a rivet or the like. A flange 81 extends upwardly of a rear edge of the rear stay plate 8 (see FIGS. 5 and 6). A rear edge portion of the plate 41 of the rear side plate 4 is bent as extending upright, and an upper edge portion 42 of the upright portion is slightly bent inward. A distal edge of the flange 81 of the rear stay plate 8 confronts an underside of the bent edge portion 42.

When the bolts 23 and 24 are tightened (see FIG. 5), a small gap S is defined between the edge of the flange 81 and the underside of the bent edge portion 42. If these bolts 23 and 24 are loosened and the front bolts 21 and 22 are removed (as shown by two-dot-and-dash lines in FIGS. 2 and 6), the transportation belt unit 1 is lowered by gravity so that the edge of the flange 81 abuts against the bent edge portion 42. Thus, the transportation belt unit 1 is inclined downward with respect to the frame 9. This allows for easy replacement of the transportation belt 2.

For the replacement of the transportation belt 2, a front portion of the document feeder 10 is first lifted to be inclined rearward, then the rear bolts 23 and 24 are loosened, and the front bolts 21 and 22 are removed. Thus, the front stay plate 7 is disengaged downward from the recess 3*a* of the front side plate 3, and the front portion of the transportation belt unit 1 is lowered by gravity and maintained in a slightly inclined state with respect to the frame 9. In this state, the transportation belt 2 can readily be drawn out forward.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application claims priority benefits under 35 USC section 119 of Japanese Patent Application No. 8-318767 filed in the Japanese Patent Office on Nov. 13, 1996, the disclosure thereof being incorporated herein by reference.

What is claimed is:

1. A document feeder, comprising:

a transportation belt unit for transporting a document original;

a front side plate and a rear side plate respectively projecting upright at widthwise opposite edges of the transportation belt unit;

a pair of stays each extending between the front side plate and the rear side plate;

a front stay plate detachably fastened to portions of the pair of stays adjacent to the front side plate by means of a front fastening member; and a rear stay plate fastened to portions of the pair of stays adjacent to the rear side plate by means of a rear fastening member which can be loosened;

wherein the front side plate has a recess open to an underside thereof for receiving the front stay plate for engagement therewith in a disengageable manner;

wherein the front stay plate is fastened to the front side plate in engagement with the recess by the front fastening member.

2. A document feeder as set forth in claim 1, wherein the rear side plate has a plate portion extending away from the front side plate, an upright portion projecting upright from the plate portion, and a portion bent toward the front side plate from the upright portion, and wherein the rear stay plate has a flange which, when the rear stay plate is fastened to the rear side plate by means of the rear fastening member, extends upward along the upright portion with a distal edge thereof confronting an underside of the bent portion in a predetermined spaced relation.

3. A document feeder as set forth in claim 2, wherein the spaced relation between the bent portion and the distal edge of the flange is such that the distal edge of the flange can be brought in abutment against the underside of the bent portion by loosing the rear fastening member.

4. A document feeder as set forth in claim 1, which is mounted on an upper surface of an image forming apparatus in a slantingly movable manner.

* * * * *